United States Patent
Li et al.

(10) Patent No.: US 9,007,024 B2
(45) Date of Patent: Apr. 14, 2015

(54) DC POWER CONTROL TO MAXIMIZE BATTERY CHARGING TIME

(75) Inventors: Fu Yu Li, Azusa, CA (US); Kalvin Chen, San Marino, CA (US)

(73) Assignee: American Reliance, Inc., El Monte, CA (US)

( * ) Notice: Subject to any disclaimer, the term of this patent is extended or adjusted under 35 U.S.C. 154(b) by 1156 days.

(21) Appl. No.: 12/128,408

(22) Filed: May 28, 2008

(65) Prior Publication Data

US 2009/0295330 A1    Dec. 3, 2009

(51) Int. Cl.
 *H02J 7/00*    (2006.01)

(52) U.S. Cl.
 CPC ............. *H02J 7/0013* (2013.01); *H02J 7/0022* (2013.01); *H02J 2007/0067* (2013.01)

(58) Field of Classification Search
 USPC ......................................................... 320/124
 See application file for complete search history.

(56) References Cited

U.S. PATENT DOCUMENTS

| | | | |
|---|---|---|---|
| 4,563,629 A | 1/1986 | Keiper | |
| 4,604,567 A | 8/1986 | Chetty | |
| 4,782,241 A | 11/1988 | Baker et al. | |
| 5,270,636 A | 12/1993 | Lafferty | |
| 5,635,816 A | 6/1997 | Welsh et al. | |
| 6,037,749 A | 3/2000 | Parsonage | |
| 6,703,810 B2 | 3/2004 | Peschke | |
| 6,707,271 B2 | 3/2004 | Kitagawa | |
| 6,713,989 B1 | 3/2004 | Reynolds | |
| 6,741,065 B1 * | 5/2004 | Ishii et al. | 320/122 |
| 6,870,089 B1 | 3/2005 | Gray | |
| 2004/0189249 A1 * | 9/2004 | Beals et al. | 320/116 |
| 2006/0187689 A1 * | 8/2006 | Hartular | 363/63 |
| 2006/0244420 A1 * | 11/2006 | Stanesti et al. | 320/128 |

OTHER PUBLICATIONS

PCT search report with written opinion, PCT/US2009/045337, Jul. 16, 2009.
English translation with Chinese First Office Action No. 200980129680.4, dated Jul. 5, 2012, pp. 24.
English translation with Chinese Second Office Action No. 200980129680.4, dated Dec. 10, 2012, pp. 5.

* cited by examiner

*Primary Examiner* — Edward Tso
*Assistant Examiner* — Johali Torres Ruiz
(74) *Attorney, Agent, or Firm* — Steven P. Chen; Edward C. Kwok; Hogan Lovells US LLP

(57) ABSTRACT

Systems and methods are provided for managing the batteries and the power source as a single combined output to power the load, allowing the system to use power source with reduced maximum power output, reducing system cost and complexity. Furthermore, the switch matrix controller efficiently and dynamically manages the internal power transfer to minimize the charging/discharging cycle of the batteries while ensuring that the power source and the batteries meet changing load power demand. Finally, maximizing charging time and having independent control of each battery increase power efficiency, prolong the operational life of the battery, and increase overall system life.

15 Claims, 5 Drawing Sheets

DC POWER CONTROL TO MAXIMIZE BATTERY CHARGING TIME

TECHNICAL FIELD

The present disclosure relates generally to power control systems. More particularly, the present disclosure relates to systems and methods for controlling power transfer in a DC (direct current) power system to maximize system power output, maximize battery charging time, and increase system life.

BACKGROUND

Conventional DC power systems include a power source, DC power controller, and batteries. Conventional DC power controllers are well known. They typically use quick-charge methods, voltage regulation/conversion, and/or battery protection to prolong battery operational life and to accelerate charging time. Typical systems utilize switches between the power source and the battery with a power controller pulse width modulating (PWM) the switches to achieve power transfer from the power source to the batteries. In such systems, the batteries are quickly charged by the power source, are discharged to power a load, and then are quickly charged again.

Although conventional DC power control systems have proven generally suitable for their intended purposes, they possess inherent deficiencies which detract from their overall effectiveness and desirability. For example, conventional DC power control systems do not effectively use power from the power source and batteries, resulting in higher system complexity and cost. Furthermore, the frequent charging and discharging cycle of the batteries degrade power transfer efficiency and decrease the operational life of the batteries, resulting in shortened system life.

BRIEF SUMMARY

Systems and methods are disclosed herein to provide improved power transfer in a switch-matrix DC power control system comprising a power source, a switch-matrix controller, and a plurality of batteries.

In accordance with an example of the present disclosure, the switch-matrix DC power control system manages total output power by combining power from the power source and power from the plurality of batteries under heavy load demand condition. Combining power from the power source and the batteries allows the system to use the power source with reduced maximum power output, reducing system cost. Under lighter load demand condition, the power source alone may power the load, and any excess power from the power source is used to charge the batteries. Using battery power only when the load requirement is greater than what the power source can supply reduces battery charging/discharging cycle, thus prolonging battery operational life.

In accordance with another example of the present disclosure, the switch-matrix DC power control system maximizes the amount of time the plurality of batteries is charging by controlling the charging and discharging of each battery independently. Each battery is by default in the charging state. The power control system monitors the input voltage at the load to control a switch matrix to dynamically discharge power from only those batteries required to drive the load. Independent charge/discharge control of each battery improves the efficiency of power transfer to the load and also prolongs battery operational life by maximizing charging time of the battery.

These and other objects and advantages of embodiments of the present disclosure will be more fully understood by reference to the following detailed description when considered in conjunction with the following drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods for improving power control in a switch-matrix DC power control system are disclosed. In a DC power control system, power sources such as solar arrays, wind turbines, hydroelectric generators, gas generators, or grid ties may be used to convert solar, wind, hydro, fossil fuel, AC electrical, or other forms of energy into DC electrical energy to drive a load.

Figure 1:
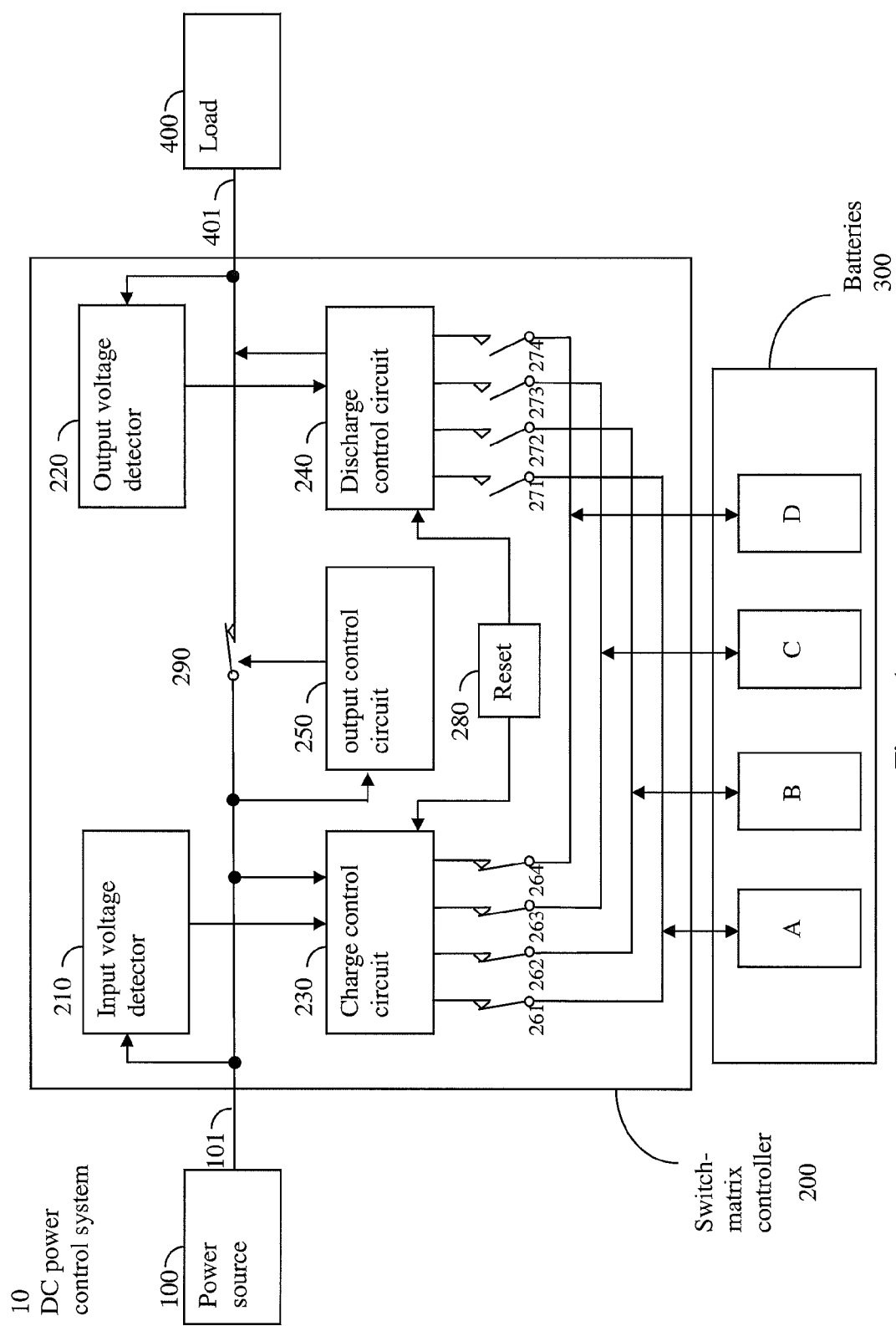
FIG. 1 is a block diagram of a DC power control system according to one or more exemplary embodiments of the present disclosure.

FIG. 1 is a block diagram of a DC power control system 10 having a power source 100, a switch-matrix controller 200, a plurality of batteries 300, and a load 400 according to one or more exemplary embodiments of the present disclosure. The power source 100, which can be, but is not limited to, a solar array, a wind turbine, a hydro power generator, a gasoline power generator, or a grid tie, generates electrical energy to build up a voltage level at a power source output 101. The switch-matrix controller 200 manages the transfer of electrical energy from the power source 100 to power the load 400, from the power source 100 to charge the plurality of batteries 300, and from the plurality of batteries 300 to power the load 400. The plurality of batteries 300 stores excess electrical energy from the power source 100 so that the stored energy may be discharged to power the load 400 either alone or in combination with the power source 100. The plurality of batteries may consist of four batteries A, B, C, D with each battery independently controlled by the switch-matrix controller 200, although other number of batteries may also be suitable depending on system requirements.

The voltage level at the power source output 101 may be monitored by an input voltage detector 210 within the switch matrix controller 200. The output from the input voltage detector 210 may be used by a charge control circuit 230 to prevent damage to the battery if the power source output 101 becomes too high. By default, a plurality of charge switches 261, 262, 263, 264 may be in the closed position to allow the flow of electrical energy from the power source output 101 to charge batteries A, B, C, D, respectively. The charge switches 261-264 may be controlled by, and configured to have the opposite state from corresponding discharge switches 271- 274. Thus, if the discharge switch is closed the corresponding charge switch will be opened, and if the discharge switch is opened the corresponding charge switch will be closed.

At the load 400, the voltage level at a load input 401 may be monitored by an output voltage detector 220 within the switch matrix controller 200 to determine if there is sufficient voltage available from the power source to power the load. The output from the output voltage detector 220 may be used by a discharge control circuit 240 to determine which, if any, of the plurality of batteries may be discharged to supplement the power from the power source. By default, discharge switches 271, 272, 273, 274 are in the opened position and may be closed by the discharge control circuit 240 to allow transfer of electrical energy to the load from batteries A, B, C, D, respectively. The discharge switches may be opened if the discharge control circuit 240 determines that the batteries have been sufficiently discharged such that they can no longer support the load.

The flow of electrical energy from the power source output 101 to the load input 401 may be through a direct output switch 290 controlled by a power source output control circuit 250. By default, the direct output switch 290 is in the closed position to transfer power from the power source directly to the load. The power source output control circuit 250 may monitor the voltage at the power source output 101. If there is excessive power source output, the power source control circuit 250 may pulse the direct output switch 290 to protect the load and to maintain a steady voltage to the load.

The discharge switches 271-274, once closed, stay in the closed position until released from that state by a reset pulse from a reset circuit 280. The reset circuit 280 may generate a periodic reset pulse to reset the discharge switches 271-274 back to their default opened position, which may in turn cause the charge switches 261-264 to be reset to their default closed position. Immediately, the output voltage detector 220 may sense the voltage at the load input 401 and the discharge control circuit 240 may determine if any of the batteries have to be discharged to drive the load. Thus, the reset circuit 280 allows the switch matrix controller 200 to periodically redistribute power transfer in response to changing load requirement.

Figure 2:
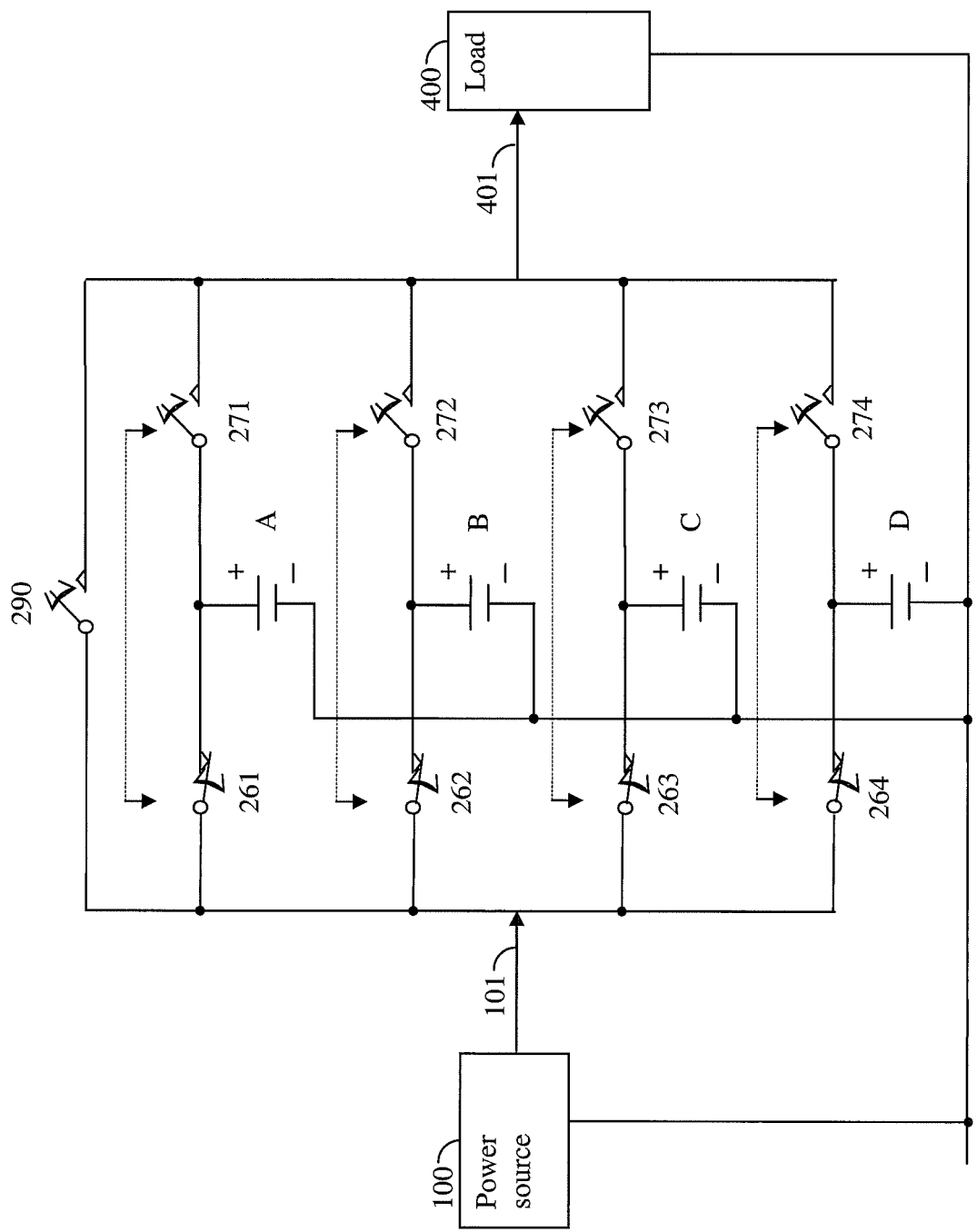
FIG. 2 is a diagram of a charge/discharge switch matrix for a plurality of batteries and a direct power switch from the power source according to one or more exemplary embodiments of the present disclosure.

Referring to FIG. 2, there is shown a distribution of electrical power using the switch matrix from the power source output 101 to the load 400, from the power source output 101 to the batteries, and from the batteries to the load 400 according to one or more embodiments of the present disclosure.

The load 400 may be powered by combining power at the power source output 101 through the direct output switch 290 and the stored energy from the batteries A, B, C, D through the discharge switches 271, 272, 273, 274. Treating the power source and the batteries as a single power supply reduces the maximum power output requirement from the power source and lowers the cost of the power source compared with using just the power source or the batteries alone to power a load. It also maximizes charging time for the batteries and minimizes battery discharging/charging cycle.

The power source output 101 provides power to the load 400 when the direct output switch 290 is in its default closed position. The direct output switch 290 may be controlled to keep excessively high voltage at the power source output 101 from damaging the load. The power source output control circuit 250 of FIG. 1 may modulate the duty cycle of the direct output switch 290 in the closed position to maintain a steady state voltage at the load. Initially, when the voltage at the load input 401 stays above a minimum threshold, indicating that the power source output alone can support the load, the batteries are in the default charging state with switches 261-264 closed and 271-274 opened. If the load demand increases and the power source output power remains the same, the current flowing into the load 400 may increase, resulting in lower voltage at the load input 401. The discharge control circuit 240 of FIG. 1 senses the load input voltage dropping below the minimum threshold and may close one or more of the discharge switches 271-274, and open the corresponding charge switches 261-264, to discharge the batteries to meet the increased load demand. If the load demand subsequently decreases, the current flowing into the load may decrease, resulting in higher voltage at the load input 401. When the load input voltage rises back above the minimum threshold, the discharge control circuit 240 may restore the discharge switches 271-274 back to the default opened position to disable discharging. The charge switches 261-264 are then restored back to their default closed position to enable charging from the power source output 101 to replenish the battery power. Discharging the batteries only when the load input voltage drops below the threshold maximizes charging time for the batteries. It also minimizes discharging/charging cycle to prolong battery life. Thus, the switch matrix is used to efficiently transfer power from the power source and the batteries to the load under changing load input condition and fluctuating power source output.

Figure 3:
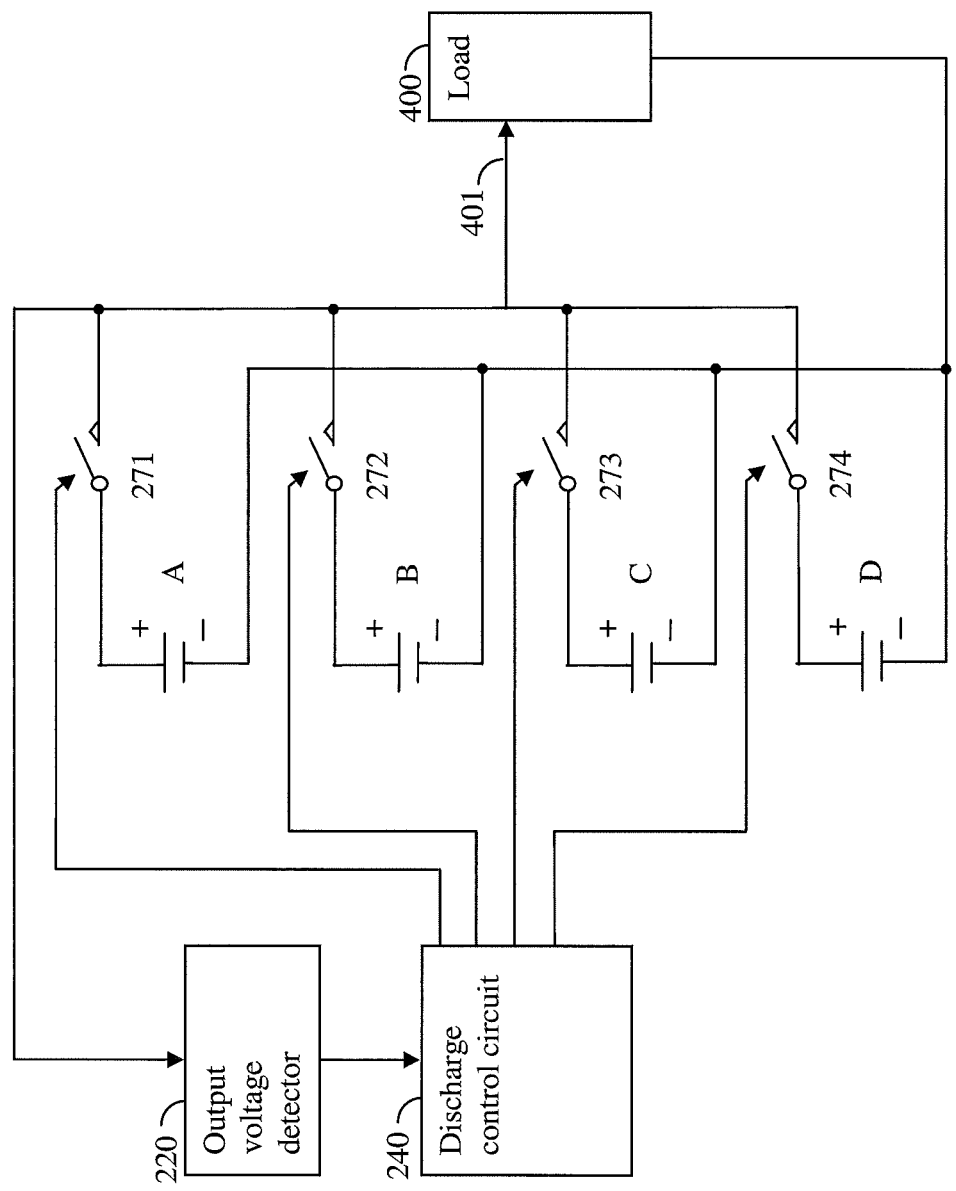
FIG. 3 is a diagram of a discharge switch matrix for a plurality of batteries as well as an output voltage detector and a discharge control circuit for controlling the discharge switch matrix according to one or more exemplary embodiments of the present disclosure.

Referring to FIG. 3, there is shown the discharge switch network comprising the output voltage detector 220, the discharge control circuit 240, the discharge switches 271-274 for the plurality of batteries A-D, and the load 400 of FIG. 1 according to one embodiment.

The output voltage detector 220 may sense the voltage level at the load input 401 after every periodic reset. This voltage level may be compared with a plurality of voltage references, one for each battery. The output of each of the reference voltage comparator may be used by the discharge control circuit 240 to determine if one or more of the batteries are to be discharged through the discharge switch 271-274 to meet the load demand. The voltage references may be set at a different level for each of the batteries so that the batteries may be incrementally discharged to meet increasing load demand or incrementally restored to the charging state as load demand decreases. For example, voltage references for battery A, B, C, D may be set at 12.5V, 12 V, 11.5V, and 11V, respectively. The voltage at the load input 401 is compared against each of the voltage references and if the load input is below any of the voltage references, the comparator may generate a signal to close the discharge switch to discharge the battery. Thus, if initially the voltage at the load input 401 is above 12.5V, it is higher than all the voltage references; the reference voltage comparators do not trigger; the discharge switches 271-274 are all in their default opened position and all the batteries are in the charging state. If the load demand increases, current flowing into the load 400 may increase, resulting in lower voltage at the load input 401. If the voltage at the load input 401 drops below 12.5V, the first reference voltage comparator may trigger, causing discharge switch 271 to close to discharge battery A to the load. If the load demand increases still further, current flowing into the load may increase further, resulting in even lower voltage at the load input. If the voltage at the load input 401 drops below 12V, the second reference voltage comparator may trigger, causing discharge switch 272 to close to discharge battery B to the load. As the load demand increases still further and voltage at the load input 401 drops below 11V, all the voltage reference comparators may trigger, causing all the discharge switches 271-274 to close to discharge all four batteries A-D to support the increased load demand. Conversely, if the load demand decreases and the voltage at the input load 401 rises from below 11V to above 12.5V, progressively more voltage reference comparators may stop triggering until eventually all the discharge switches 271-274 are opened, causing batteries A-D to be restored to their charging state to be replenished by the power source. The discharge control circuit 240 may also have a safety mechanism to terminate discharging from all the batteries if the voltage at the load input 401 drops below a minimum battery voltage threshold. As the batteries discharge, voltage level at their output and at the load input 401 may decline. If high load demand continues unabated, batteries may be discharged until power is nearly depleted, causing the voltage at the load input 401 to drop below the minimum battery voltage threshold. When this happens, all the discharge switches may open and the batteries may be disconnected from the load until their power is restored.

Figure 4:
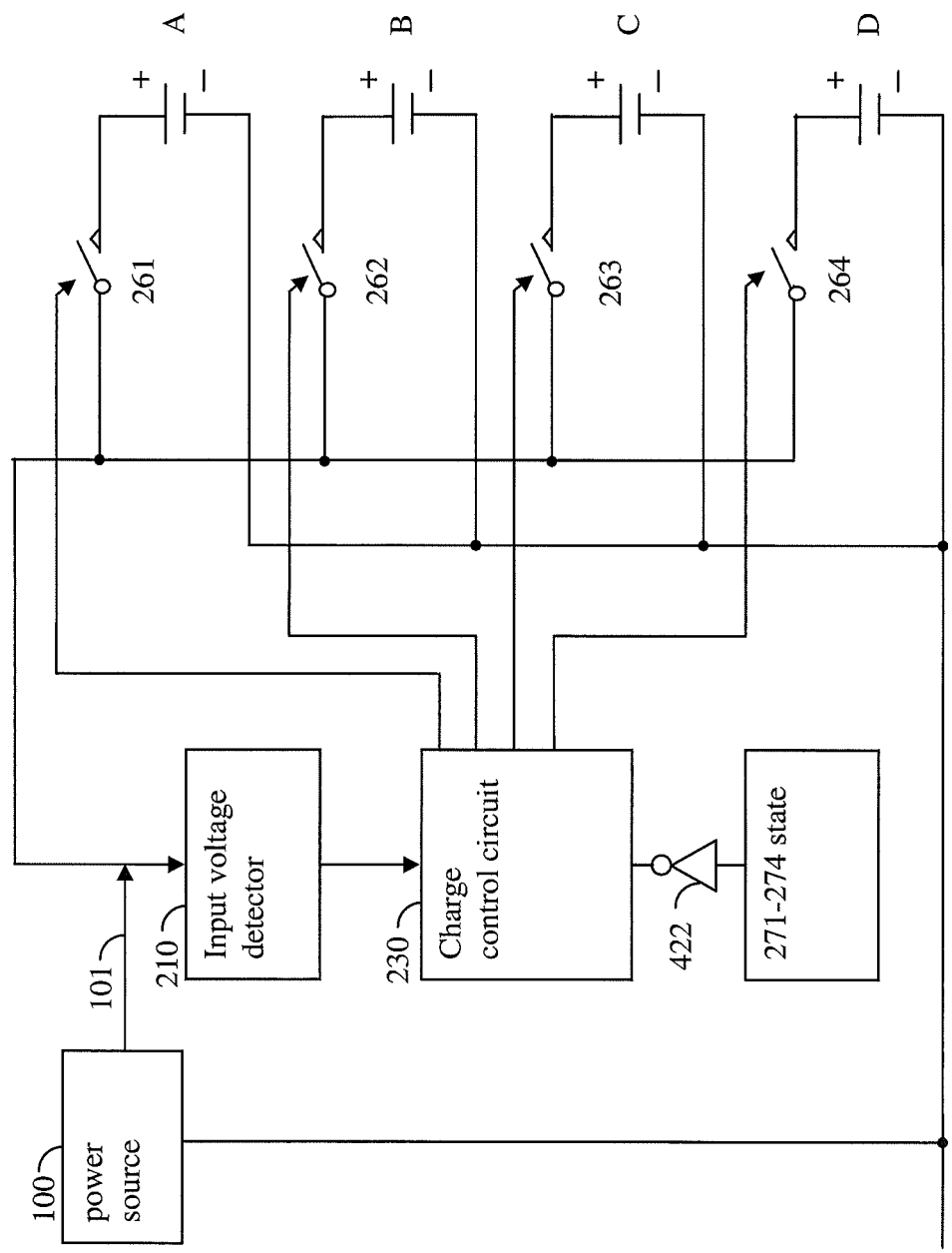
FIG. 4 is a diagram of a charge switch matrix for a plurality of batteries as well as an input voltage detector and a charge control circuit for controlling the charge switch matrix according to one or more exemplary embodiments of the present disclosure.

Referring to FIG. 4, there is shown the charge switch network comprising of the input voltage detector 210, the charge control circuit 230, the state of the discharge switches 271-274, and the charge switches 261-264 for the plurality of batteries A-D of FIG. 1 according to one embodiment.

The input voltage detector 210 may sense the voltage at the power source output 101 to detect any excessively high voltage from the power source 100. The voltage at the power source output 101 may be compared with a voltage reference. If the power source output voltage becomes too high, it may exceed the voltage reference, causing the comparator to trigger. To prevent the high voltage from charging and damaging the battery, the output of the triggered comparator may be used by the charge control circuit 230 to pulse modulate the voltage to the batteries. The charging and discharging of the batteries are controlled independently for each battery. The charge switches 261-264 may be configured to have the opposite state from the discharge switches 271-274 as shown by an inverter 422. Since the discharge switches 271-274 are by default opened unless increased load demand necessitates discharging the batteries to supplement the power source, the charge switches 261-264 are by default in the closed position to charge the batteries. Maximizing the time the battery is in the charging state reduces the frequency of charge/discharge cycle of the battery, helping to prolong battery life. If increasing load demand requires the discharge switches to close, the charge switches 261-264 may correspondingly open to terminate charging of the batteries. Conversely, as soon as the discharge switches are opened due to easing load demand or when the batteries are nearly depleted, the charge switches 261-264 may close to enable charging again. When more than one charge switch is closed, charging may be distributed such that proportionally more power is distributed to batteries with lower level of charge. Therefore, charging follows the path of least resistance, both to maximize power efficiency and to prevent the lowest charged battery from discharging completely.

Figure 5:
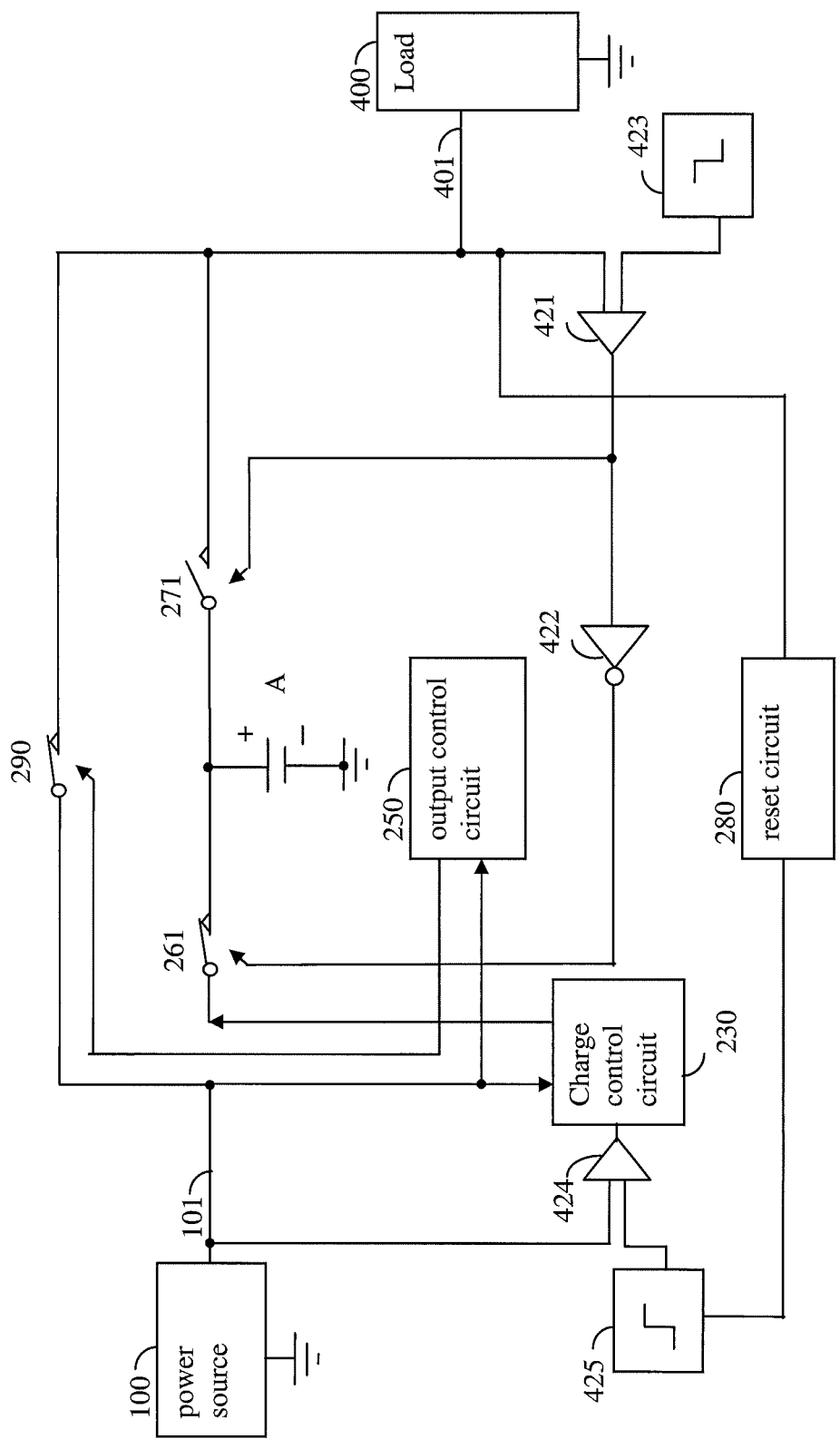
FIG. 5 is a block diagram of a detector/control circuit used to control a charge/discharge switch matrix for a single battery bank according to one or more embodiments of the present disclosure.

Referring to FIG. 5, there is shown the interaction among the functional blocks of the switch matrix controller 200 to control charging and discharging for battery A, and to control the transfer of power from the power source to the load.

The voltage at the load input 401 may be compared against a load input voltage reference 423 through a load input voltage comparator 421 for controlling the discharge switch 271 of battery A. The load input voltage reference 423 may be fixed for a given battery but may be set at different voltage levels for different batteries so that different batteries may start discharging at different times. When the voltage at the load input 401 exceeds the load input voltage reference 423, the load input voltage comparator 421 does not trigger and the discharge switch 271 is in the default open position. If the load input voltage 401 decreases due to increased load demand and the voltage drops below the load input voltage reference 423, the load input voltage comparator 421 may trigger to close the discharge switch 271 to discharge battery A. Once the load input voltage comparator 421 triggers, it stays in the triggered position until the reset circuit 280 releases the trigger. The reset circuit 280 may generate a periodic reset pulse to reset the load input voltage comparator 421 and the discharge switch 271 back to their default state. Immediately after the reset, the load input voltage comparator 421 again may compare the voltage at the load input 401 against the load input voltage reference 423. If the load input voltage 401 is still below the load input voltage reference 423, the load input voltage comparator 421 may again trigger to close the discharge switch 271. The reset pulse is kept short so that even if the discharge switch 271 toggles from the closed to opened back to the closed position, capacitive loading may smooth out any high frequency voltage switching at the load input 401. The period of the reset pulse may be varied to allow the load input voltage comparator 421 to better adapt to fluctuating voltage at the load input 401. The reset circuitry 280 may also terminate any further triggering of the load input voltage comparator 421 if the voltage at the load input 401 drops too low as the batteries are nearly depleted.

The output of the load input voltage comparator 421 may be inverted by an inverter 422 so that the charge switch 261 is always in the opposite state from the discharge switch 271. Thus, battery A is by default in the charging state after every reset pulse unless the load input voltage comparator 421 triggers to discharge battery A. The power source output 101 may also be compared with a power source voltage reference 425 through a power source voltage comparator 424. If the power source output 101 exceeds the power source voltage reference 425, the power source voltage comparator 424 may trigger to cause the charge control circuit 230 to pulse the voltage to the charge switch 261. Since the charge switch 261 is under the control of the load input voltage comparator 421 and cannot be independently controlled to respond to voltage fluctuation at the power source output 101, pulsing the voltage into the charge switch 261 prevents excessively high voltage at the power source output 101 from damaging battery A. The reset circuit 280 may control the power source voltage reference 425 to periodically reset the power source voltage comparator 424. The reset to the power source voltage comparator 424 may be synchronized with the reset to the load input voltage comparator 421. The period of the reset may be varied to allow the power source voltage comparator 424 to better adapt to fluctuating voltage at the power source output 101.

The direct output switch 290 controls the transfer of power from the power source 100 to the load 400. By default, the direct output switch 290 is in the closed position. However, similar to the safety mechanism for the batteries, the direct output switch 290 may be controlled to protect the load 100. The power source output 101 may be monitored by the output control circuit 250. If there is excessively high voltage at the power source output 101, the output control circuit 250 may modulate the direct output switch 290 to open and close in a pulsed manner to protect the load and to maintain a steady voltage to it.

The switch matrix controller 200 of FIG. 1 manages the batteries and the power source as a single combined output to power the load, allowing the system to use power source with reduced maximum power output, reducing system cost and complexity. Furthermore, the switch matrix controller efficiently and dynamically manages the internal power transfer to minimize the charging/discharging cycle of the batteries while ensuring that the power source and the batteries meet changing load power demand. Finally, the switch matrix controller maximizes battery charging time and independently controls each battery to increase power efficiency, prolonging the operational life of the battery and increasing overall system life.

Although exemplary embodiments of the present disclosure have been described, the exemplary embodiments illustrate, but do not limit the invention. It should be understood that embodiments of the present disclosure should not be limited to these exemplary embodiments but numerous modifications and variations may be made by one of ordinary skill in the art and be included within the spirit and scope of the present disclosure as hereinafter claimed. For example, any type of element that functions as a switch can be used for switches 261-264, 271-274, and 290. Control circuits 230, 240, and 250 may be combined individually with its corresponding switch or switches.

The invention claimed is:

1. A switch matrix power control system comprising:
a plurality of charge switches between a power source and a plurality of batteries;
a charge control circuit coupled to the plurality of charge switches, wherein the plurality of charge switches is adapted to selectively transfer power from the power source to a corresponding battery from the plurality of batteries;
a plurality of discharge switches between the plurality of batteries and a load;
a discharge control circuit coupled to the plurality of discharge switches, wherein the plurality of discharge switches is adapted to selectively transfer power from one or more of the batteries to the load in a fixed order of discharge, wherein each of the batteries starts the transfer of power based on the fixed order independent of a voltage of each of the batteries, and wherein the batteries are restored to a charging state to receive power from the power source through the plurality of charge switches in a fixed order of charge that is reversed from the fixed order of discharge such that the fixed order of charge is also independent of the voltage of each of the batteries;
a reset circuit coupled to the charge control circuit and the discharge control circuit to generate a periodic reset pulse to periodically open the plurality of discharge switches to stop the discharge from any of the batteries to the load and to periodically close the plurality of charge switches to restore all the batteries to the charging state, wherein after the periodic reset pulse the discharge control circuit determines whether to re-close any of the discharge switches;
a direct output switch between the power source and the load; and
an output control circuit coupled to the direct output switch to selectively transfer power from the power source to the load.

2. The switch matrix power control system of claim 1, wherein the transfer of power from one or more of the batteries to the load is combinable with the transfer of power from the power source to the load.

3. The switch matrix power control system of claim 1, further comprising a plurality of voltage comparators and a plurality of voltage references coupled to the discharge control circuit, wherein one of the voltage comparators compares a voltage at the load against one of the voltage references for starting the transfer of power from one of the batteries to the load, and wherein each of the voltage references is at a different level to correspond to the fixed order of discharge.

4. The switch matrix power control system of claim 1, wherein the charge switch and the discharge switch corresponding to one of the batteries are in the opposite state.

5. The switch matrix power control system of claim 1, further comprising:
a plurality of first voltage comparators and a plurality of first voltage references coupled to the discharge control circuit, wherein one of the voltage comparators compares a voltage at the load against one of the first voltage references for terminating the transfer of power from one of the batteries to the load;
a second voltage comparator and a second voltage reference coupled to the charge control circuit to compare a voltage at the power source against the second voltage reference for protecting the plurality of batteries against excessively high power source voltage; and
a third voltage comparator and a third voltage reference coupled to the output control circuit to compare a voltage at the power source against the third voltage reference for protecting the load against excessively high power source voltage.

6. A power control system comprising:
a first switch coupled between a power source and a load;
a plurality of charging switches coupled between the power source and a plurality of batteries to charge one or more of the batteries from the power source;
a plurality of discharging switches coupled between the load and the plurality of batteries;
a first detector coupled to the load to determine whether power supplied to the load is from the power source, one or more of the batteries, or a combination of the power source and one or more of the batteries, wherein the one or more of the batteries discharge through one or more of the discharging switches in a fixed order of discharge independent of a voltage of each of the one or more batteries, and wherein the batteries are restored to be charged from the power source through the plurality of charging switches in a fixed order of charge that is reversed from the fixed order of discharge such that the fixed order of charge is also independent of the voltage of each of the one or more batteries, and
a reset circuit to generate a periodic reset pulse to periodically open the plurality of discharging switches to stop the discharge from any of the batteries to the load and to periodically close the plurality of charging switches to restore all the batteries to be charged from the power source, wherein after the periodic reset pulse the first detector determines whether to re-close any of the discharging switches.

7. The system of claim 6, further comprising a second detector coupled to the power source to determine whether power from the power source is supplied to one or more of the batteries through one or more of the charging switches, the load, or a combination of the load and one or more of the batteries.

8. The system of claim 6, further comprising:
a charge control circuit coupled between the plurality of charging switches and the power source to independently control each of the charging switches;

a discharge control circuit coupled between the plurality of discharging switches and the load to independently control each of the discharging switches; and an output control circuit coupled between the first switch and the power source to control the first switch.

9. The system of claim 8, wherein the reset circuit is coupled between the charge and discharge control circuits.

10. The system of claim 6, wherein the charging switch and the discharging switch for a corresponding battery from the plurality of batteries are in opposite states.

11. A method of managing power to a load comprising:

determining a voltage required by the load;

supplying the voltage from a power source if the power source is sufficient to supply the voltage;

supplying the voltage from the power source and one or more batteries of a plurality of batteries if the power source is insufficient to supply the voltage, wherein the plurality of batteries has a fixed order of discharge independent of a voltage of each of the batteries, wherein a battery from the plurality of batteries with a later order of discharge starts supplying power to the load if power from all batteries with earlier order of discharge are insufficient to supply the voltage, and wherein the plurality of batteries is restored to a charging state to receive power from the power source in a fixed order of charge that is reversed from the fixed order of discharge if the power from the plurality of batteries is sufficient to supply the voltage such that the fixed order of charge is also independent of the voltage of each of the batteries; and periodically stopping the discharge from any of the batteries to the load, periodically restoring all the batteries to the charging state, and determining whether to resume supplying power from one or more batteries to the load.

12. The method of claim 11, further comprising:

determining a voltage from the power source; and pulse charging the plurality of batteries from the power source if the voltage from the power source is higher than a reference voltage for the plurality of batteries.

13. The method of claim 11, further comprising:

determining a voltage from the load; and terminating the supplying of voltage from the one or more batteries if the voltage from the load is below a reference voltage for the plurality of batteries.

14. The method of claim 11, further comprising:

determining a voltage from the power source; and pulsing the voltage from the power source to the load if the voltage from the power source is higher than a reference voltage.

15. The method of claim 11, further comprising charging one or more of the batteries from the power source when power from the one or more batteries is not needed for the load, wherein when charging a plurality of the batteries, proportionately more power is distributed to a charging battery having a lower voltage than a charging battery having a higher voltage.

* * * * *